(12) United States Patent
Tanaka

(10) Patent No.: US 7,099,634 B2
(45) Date of Patent: Aug. 29, 2006

(54) TRANSMITTING DIVERSITY COMMUNICATIONS APPARATUS

(75) Inventor: Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 469 days.

(21) Appl. No.: 10/358,711

(22) Filed: Jan. 31, 2003

(65) Prior Publication Data
US 2003/0124995 A1 Jul. 3, 2003

Related U.S. Application Data

(63) Continuation of application No. PCT/JP00/05380, filed on Aug. 10, 2000.

(51) Int. Cl.
H04B 7/02 (2006.01)
(52) U.S. Cl. .................... 455/101; 455/69; 455/562.1; 375/299
(58) Field of Classification Search ............. 455/562.1, 455/101, 69, 562; 375/299
See application file for complete search history.

(56) References Cited

U.S. PATENT DOCUMENTS

| | | | | |
|---|---|---|---|---|
| 6,141,542 | A * | 10/2000 | Kotzin et al. ............... | 455/101 |
| 6,526,291 | B1 * | 2/2003 | Ekstrom et al. ........... | 455/562.1 |
| 6,594,473 | B1 * | 7/2003 | Dabak et al. ............... | 455/101 |
| 6,728,307 | B1 * | 4/2004 | Derryberry et al. ........ | 375/219 |
| 6,754,286 | B1 * | 6/2004 | Hottinen et al. ............ | 375/299 |
| 6,763,225 | B1 * | 7/2004 | Farmine et al. ........... | 455/67.16 |

FOREIGN PATENT DOCUMENTS

| | | |
|---|---|---|
| JP | 58-87928 | 5/1983 |
| JP | 3-201629 | 9/1991 |
| JP | 3-239019 | 10/1991 |
| JP | 5-300059 | 11/1993 |
| JP | 6-197059 | 7/1994 |
| JP | 9-200115 | 7/1997 |
| JP | 10-126138 | 5/1998 |
| JP | 10-190537 | 7/1998 |
| WO | WO 00/36764 | 6/2000 |

OTHER PUBLICATIONS

European Search Report dated Dec. 6, 2004.
An Extension of Closed Loop Tx Diversity Mode 1 for Multiple Tx Antennas. 3GPP TSG RAN WGI May 22, 2000.
Proposal for the use of closed loop Tx diversity with more than 2 Tx Antennas. TSG-RAN Working Group 1 Apr. 10-13, 2003.
Advanced Closed Loop Tx Diversity Concept. 3GPP TSG RAN WG I Jul. 4, 2000.
European Official Communication dated Mar. 30, 2005.
European Search Report dated Dec. 18, 2005.
European Search Report dated Nov. 17, 2005.

* cited by examiner

Primary Examiner—Nguyen T. Vo
Assistant Examiner—Adeel Haroon
(74) Attorney, Agent, or Firm—Katten Muchin Roseman LLP

(57) ABSTRACT

The plurality of antennas of a base station used for transmitting diversity are divided into groups. Each antenna is located so that signals transmitted from antennas in the same group have a high fading correlation. Each antenna group is spaced so that a fading correlation between the groups may become low. Since signals transmitted from an antennas in the same group have high fading correlation, such signals suffer little from fading fluctuations and a low control speed is acceptable. However, control between the groups must be exercised at a high speed. Therefore, a mobile station that receives the signals of the base station feeds back feedback information for controlling fading fluctuations between the groups and information within a group to the base station at a high transfer rate and at a low transfer rate, respectively.

23 Claims, 14 Drawing Sheets

| ANTENNA 1 P₁ | A | A | A | A | A | A | A | A | A | A | A | A |
|---|---|---|---|---|---|---|---|---|---|---|---|---|
| ANTENNA 2 P₂ | A | A | -A | -A | A | A | -A | -A | A | A | -A | -A |
| ANTENNA 3 P₃ | A | -A | A | -A | A | -A | A | -A | A | -A | A | -A |
| ANTENNA 4 P₄ | A | -A | -A | A | A | -A | -A | A | A | -A | -A | A |

$A = 1+j$

F I G. 5

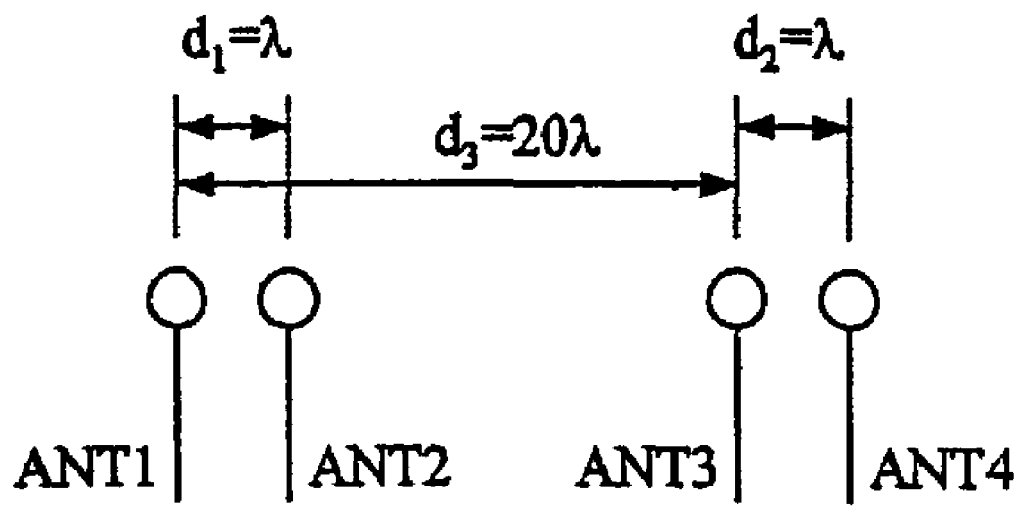
F I G. 6A
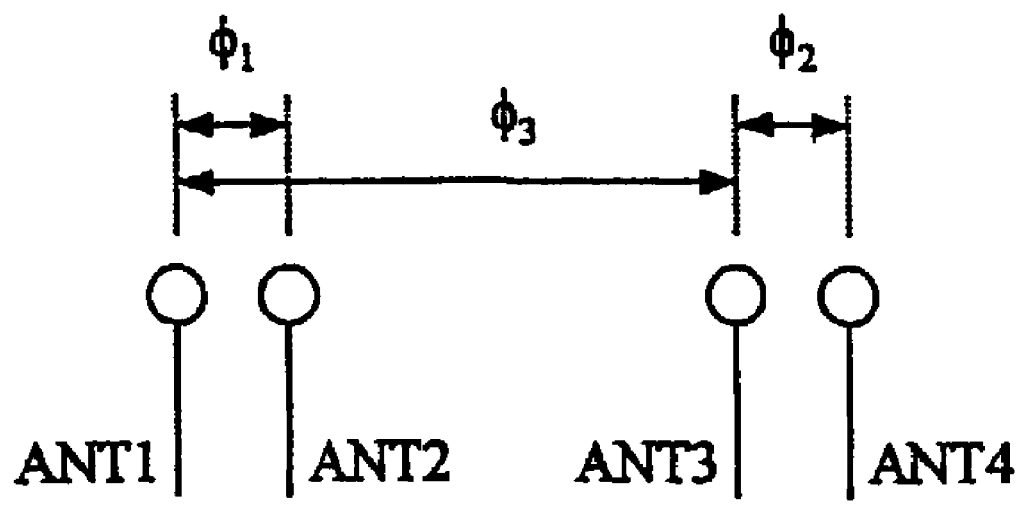
F I G. 6B

FORMAT 5

TABLE 1. FEEDBACK BIT ($b_3(0)$)

| $b_3(0)$ | ANTENNA 1 AMPLITUDE | ANTENNA 2 AMPLITUDE |
|---|---|---|
| 0 | 0.2 | 0.8 |
| 1 | 0.8 | 0.2 |

TABLE 2. FEEDBACK BIT ($b_3(3), b_3(2), b_3(1)$)

| $b_3(3), b_3(2), b_3(1)$ | INTER-ANTENNA PHASE DIFFERENCE (DEGREE) |
|---|---|
| 000 | 180 |
| 001 | -135 |
| 010 | -90 |
| 011 | -45 |
| 100 | 0 |
| 101 | 45 |
| 110 | 90 |
| 111 | 135 |

TABLE 3. FEEDBACK BIT ($b_1(2), b_1(1), b_1(0)$)

| $b_1(2), b_1(1), b_1(0)$ | INTER-ANTENNA PHASE DIFFERENCE (DEGREE) |
|---|---|
| 000 | 180 |
| 001 | -135 |
| 010 | -90 |
| 011 | -45 |
| 100 | 0 |
| 101 | 45 |
| 110 | 90 |
| 111 | 135 |

F I G. 11

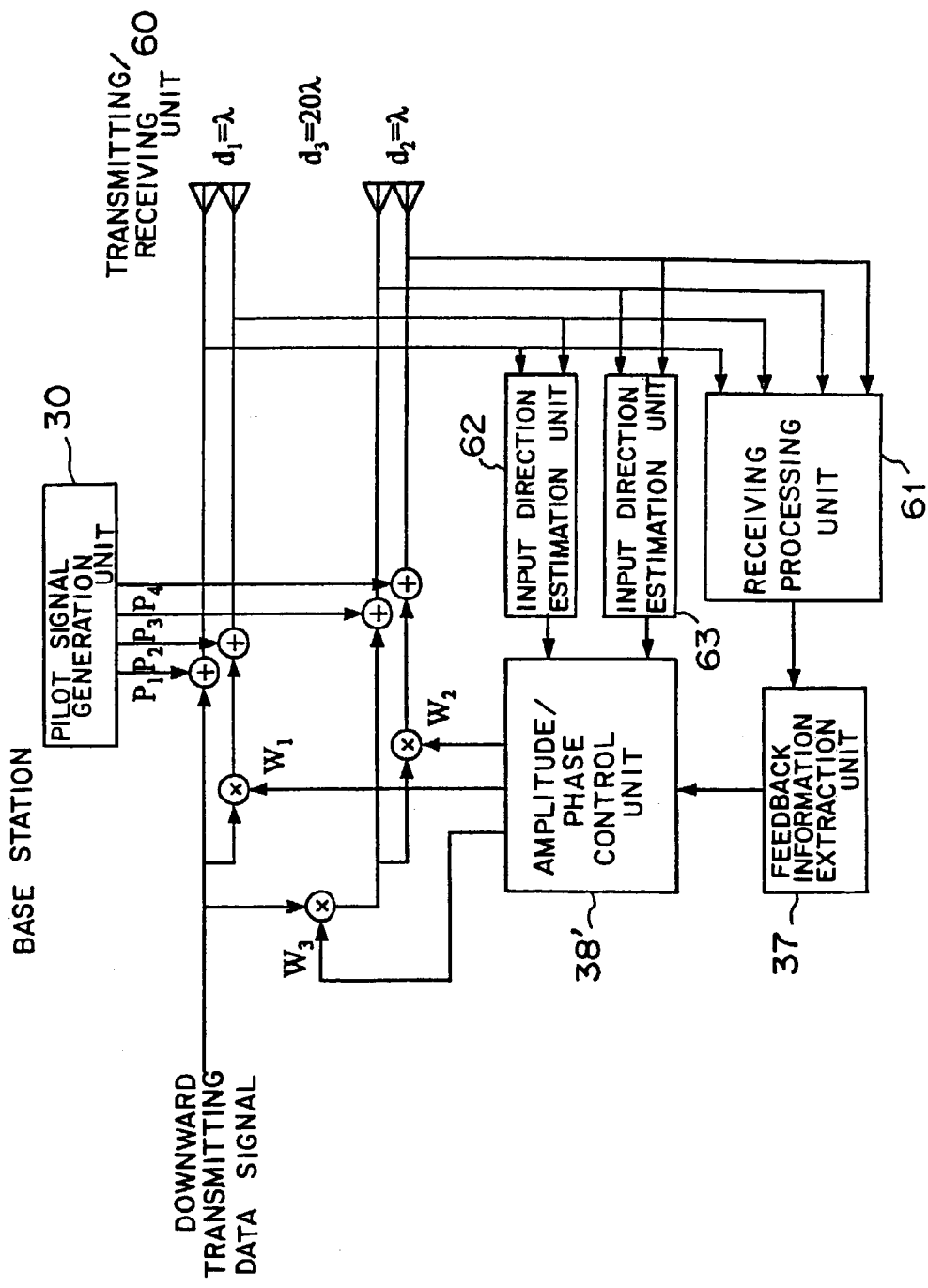
F I G. 13

TRANSMITTING DIVERSITY COMMUNICATIONS APPARATUS

CROSS REFERENCE TO RELATED APPLICATION

This application is a continuation of International PCT Application No. PCT/JP00/05380 filed on Aug. 10, 2000.

BACKGROUND OF THE INVENTION

1. Field of the Invention

The present invention relates to a transmitting diversity communications apparatus.

2. Description of the Related Art

Transmitting diversity in W-CDMA, which is the third-generation mobile communications system, adopts a method using two transmitting antennas.

FIG. 1 shows an example configuration of a transmitting diversity system using two transmitting antennas.

Mutually orthogonal pilot patterns $P_1$ and $P_2$ are transmitted from two transmitting antennas 1 and 2, respectively, as pilot signals, and channel impulse response vectors $\underline{h}_1$ and $\underline{h}_2$ from each antenna of a base station up to the receiving antenna of a mobile station are estimated by correlating each known pilot pattern to an incoming pilot on the receiving side of the mobile station.

A control amount calculation unit 10 calculates and quantizes the amplitude/phase control vector (weight vector) $\underline{w}=[w_1, w_2]$ of each transmitting antenna of the base station that maximizes power P expressed by the following equation (1) using these channel estimation values. Then, a multiplex unit 11 multiplexes the quantized weight vectors with an uplink channel signal as feedback information and transmits the signal to the base station. However, since there is no need to transmit both values $w_1$ and $w_2$, it is acceptable to transmit only value $w_2$ obtained by assigning $w_1=1$.

$$P=\underline{w}^H H^H H \underline{w} \tag{1}$$

$$H=[\underline{h}_1, \underline{h}_2] \tag{2}$$

In equation (2), $\underline{h}_1$ and $\underline{h}_2$ are the channel impulse response vectors from the transmitting antennas 1 and 2, respectively, and the superscript H on $H^H$ and $w^H$ indicates the Hermitian conjugation of H and w, respectively. If an impulse response length is assumed to be L, the channel impulse response vector is expressed as follows.

$$\underline{h}_i=[h_{i1}, h_{i2}, \ldots, h_{iL}] \tag{3}$$

Therefore, in the case of two transmitting antennas, equation (1) is calculated based on the following algebraic calculation.

$$H = \begin{bmatrix} h_{11} & h_{21} \\ h_{12} & h_{22} \\ \vdots & \vdots \end{bmatrix}, \underline{w}=[w_1,w_2]^T, \text{ therefore } Hw = \begin{bmatrix} h_{11}w_1+h_{21}w_2 \\ h_{12}w_1+h_{21}w_2 \\ \vdots \end{bmatrix}$$

At the time of handover, weight vector $\underline{w}$ that maximizes the following equation is calculated instead of equation (1).

$$P=\underline{w}^H(H^H_1 H_1 + H^H_2 H_2 + \ldots)w \tag{4}$$

In equation (4), $H_k$ is a channel impulse response signal from the k-th base station.

Then, the feedback information extraction unit 12 on the transmitting side extracts $w_2$ (in this case, $w_1=1$ is assumed) transmitted from a mobile station, from an incoming signal and an amplitude/phase control unit 13 multiplies a data signal to be transmitted from the transmitting antenna 2 by $w_2$. In this way, the degradation of both the amplitude and phase of signals received from the transmitting antennas 1 and 2 that are received on the receiving side are corrected in advance and are transmitted from the transmitting side.

In W-CDMA, two methods are stipulated: mode 1 for quantizing weight coefficient $w_2$ into one bit and mode 2 for quantizing $w_2$ into four bits. In mode 1, since control is exercised by transmitting one bit of feedback information for each slot, control speed is high. However, since quantization is rough, accurate control is impossible. In mode 2, since control is exercised by transmitting four bits of information, more accurate control is possible. However, in mode 2, since only one bit can be transmitted for each slot and feedback information of one word is transmitted for every four slots, control cannot track fading in the case of a high fading frequency, and amplitude/phase characteristics degrade. As described above, if the signal transfer rate of an upward channel from a mobile station to a transmitting station, for transmitting feedback information is restricted, control accuracy and fading track speed have an inverse relationship.

The Release-99 specification of W-CDMA standard does not take into consideration a case where more than two transmitting antennas are used so as to avoid the degradation of uplink channel transmission efficiency due to feedback information transmission. However, if the increase of feedback information or the degradation of update speed is allowed, the number of antennas can also be increased to three or more. In particular, currently a case where four transmitting antennas are used is being extensively researched and developed.

If a closed-loop transmitting diversity system is applied to the radio base station of a cellular mobile communications system, a signal from each transmitting antenna independently suffers from fading, and ideally the same phase combination is performed at the antenna position of the mobile station. Therefore, a diversity gain corresponding to the number of transmitting antennas can be obtained and the gain can also be improved by the combination. Accordingly, the receiving characteristic is improved and the number of users accommodated in one cell can also be increased. "Ideally" means a case where there is neither transmission error of feedback information, control delay, channel response estimation error nor quantization error of a control amount. In reality, the characteristic degrades due to these factors compared with that of the ideal case.

In order to obtain a diversity gain corresponding to the number of antennas, antenna spacings (the distances between antennas) must be wide so that fading correlation may become sufficiently low. Generally, in order to suppress fading correlation to a sufficiently low level in the radio base station of a cellular mobile communications system, antenna spacings must be approximately 20 wavelengths. Since one wavelength is approximately 15 cm in a 2 GHz band, antennas must be installed approximately 3 meters apart. Therefore, if the number of transmitting antennas increases, an area needed to install antennas becomes wide and it becomes difficult to install antennas on the roof of a building and the like, which is a problem. Diversity gain is saturated as the number of transmitting antennas increases. Therefore, when the number of transmitting antennas reaches a specific value, the diversity gain cannot be improved any further even if the number of transmitting antennas is further increased.

When the number of transmitting antennas is increased, an amount of information to be fed back increases since feedback information must be transmitted to each antenna. Therefore, in that case, the transmission efficiency of an uplink channel degrades due to feedback information transmission or the control of transmitting diversity cannot track high-speed fading. As a result, the characteristic degrades, which is another problem.

SUMMARY OF THE INVENTION

An object of the present invention is to provide a transmitting diversity communications apparatus for suppressing the increase of uplink feedback information if the number of transmitting antennas is increased, suppressing the degradation of a characteristic in the case of a high fading frequency and requiring a small antenna installation space in the base-station.

The transmitting diversity communications apparatus of the present invention includes a transmitting diversity base station for controlling transmitting signals, according to information from a mobile station. The transmitting diversity communications apparatus comprises an antenna unit composed of a plurality of antenna groups, each consisting of a plurality of antennas, located close to each other so that the fading correlation between the antennas in the same group is high and groups are located apart from one another so that the fading correlation between the groups is low, and a control unit receiving both the first control information about intra-group antenna control with a low transfer rate that is transmitted from a mobile station and the second control information about inter-group antenna control and controlling the phase of a signal transmitted by the antenna unit.

According to the present invention, if signal control is applied to a closed-loop transmitting diversity system by the same method as in the conventional case where two transmitting antennas are used, by increasing the number of transmitting antennas, the tracking of fading fluctuations and transmitting-signal control performance can be prevented from degrading due to the increase of an amount of information to be transmitted from a mobile station to a base station.

In particular, according to the present invention, since the antenna unit of a base station is composed of a plurality of antenna groups each consisting of a plurality of antennas, and each intra-group antenna and each antenna group is set so that fading correlation is high within a group and so that fading correlation is low between groups, respectively, only transmitting-signal control information between groups must be transmitted at a high speed from a mobile station to a base station and transmitting-signal control information within a group can be relatively slow. Therefore, transmitting diversity performance can be improved by effectively utilizing the limited transfer rate of an upward line from a mobile station to the base station.

BRIEF DESCRIPTION OF DRAWINGS

FIG. 5 shows an example of a downlink pilot signal pattern in the preferred embodiment.

FIG. 6 shows both an example configuration of a base station transmitting antennas and antenna control information according to the preferred embodiment.

FIG. 8 shows an example of the transmission format of feedback information in the preferred embodiment (No. 1).

FIG. 9 shows an example of the transmission format of feedback information in the preferred embodiment (No. 2).

FIG. 11 shows an example of the transmission format of feedback information in the preferred embodiment (No. 4).

FIG. 13 shows an example configuration of a base station in the second preferred embodiment of the present invention.

DESCRIPTION OF THE PREFERRED EMBODIMENTS

The present invention relates to a closed-loop transmitting diversity method according to which the radio base station of a cellular mobile communications system is provided with a plurality of antennas, both different amplitude and phase control are exercised over the same transmitting data, according to feedback information from a mobile station and a plurality of pieces of data are transmitted using different antennas. On the mobile station side, the amplitude/phase control amounts are determined using a downward pilot signal; feedback information indicating the amplitude/phase control amounts are multiplexed with an uplink channel signal; and the data is transmitted to the base station.

Figure 1:
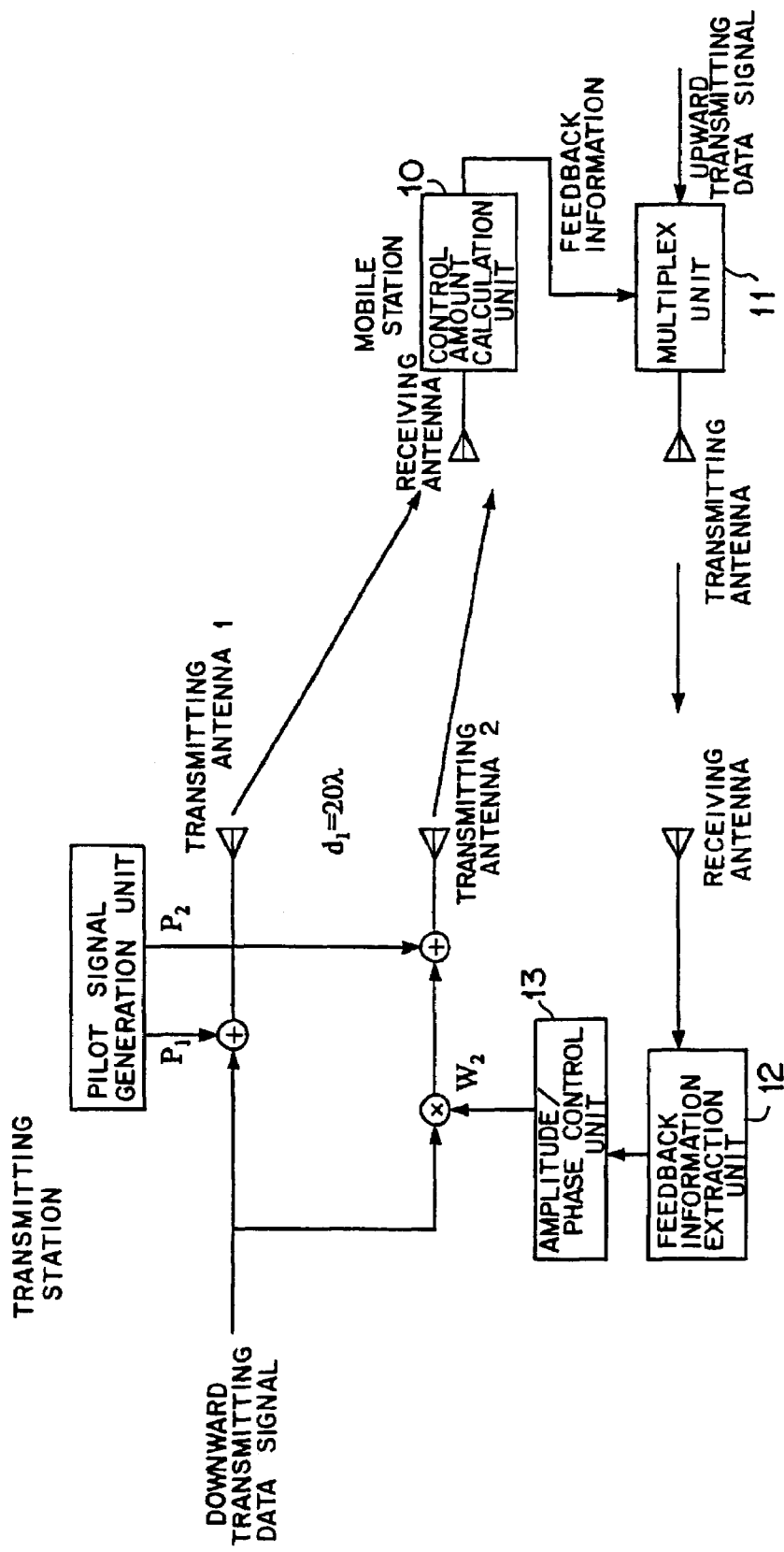
FIG. 1 shows an example configuration of a transmitting diversity system using two transmitting antennas.
Figure 2:
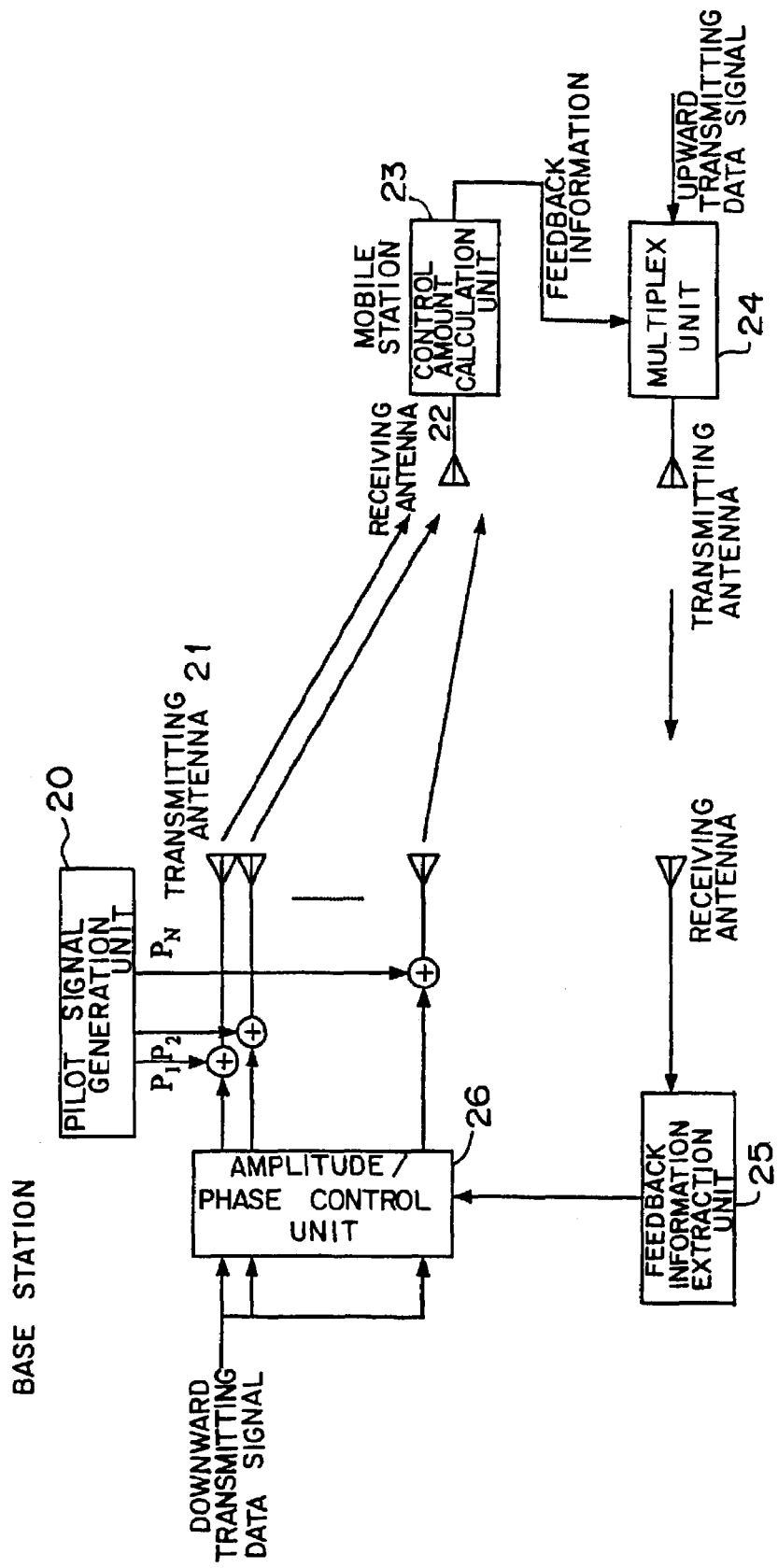
FIG. 2 shows the system configuration of the present invention.

FIG. 2 shows the system configuration of the present invention.

The pilot signal generation unit 20 of a base station generates N mutually orthogonal pilot signals $P_1(t)$, $P_2(t)$, ... $P_N(t)$ and the pilot signals are transmitted using different antennas. N is the number of transmitting antennas. The following relationship is established between these pilot signals.

$$\int P_i(t)P_j(t)dt=0 \ (i \neq j)$$

Each pilot signal suffers from both amplitude and phase fluctuations due to fading, and a signal obtained by combining these pilot signals is transmitted to the receiving antenna 22 of a mobile station. The receiver of the mobile station estimates the channel impulse response vectors $h_1$, $h_2$, ..., $h_N$ of each pilot signal by calculating the correlation between the incoming pilot signal and each of $P_1(t)$, $P_2(t)$, ..., $P_N(t)$.

A control amount calculation unit 23 calculates and quantizes the amplitude/phase control vector (weight vector) $\underline{w}=[w_1, w_2, \ldots, w_N]^T$ of each transmitting antenna of the base station that maximizes power P expressed by equation (5)(the same as equation (1)) using these channel impulse response vectors. A multiplex unit 24 multiplexes the quantized vector with an upward channel signal as feedback information and transmits the signal to the base station side. However, in this case it is acceptable to transmit values $w_2, w_3, \ldots, w_N$ obtained by assigning $w_1=1$.

$$P = \underline{w}^H H^H H \underline{w} \tag{5}$$

$$H = [\underline{h}_1, \underline{h}_2, \ldots, \underline{h}_N] \tag{6}$$

In equation (6), $\underline{h}_1$ is a channel impulse response vector from transmitting antenna i. If an impulse response length is assumed to be L, $\underline{h}_1$ is expressed as follows.

$$\underline{h}_1 = [h_{i1}, h_{i2}, \ldots, h_{iL}]^T \tag{7}$$

At the time of hand-over, weight vector $\underline{w}$ that maximizes the following equation is calculated instead of equation (5).

$$P = \underline{w}^H (H^H_1 H_1 + H^H_2 H_2 + \ldots) \underline{w} \tag{8}$$

In equation (8), $H_k$ is a channel impulse response signal from the k-th base station, and is the same as $H_k$ in equation (4).

The multiplex unit 24 of the mobile station multiplexes the weight vector obtained in this way with an upward transmitting data signal and the vector is transmitted to the receiving antenna of the base station. In the base station, a feedback information extraction unit 25 extracts the feedback information received by a receiving antenna, and an amplitude/phase control unit 26 controls both the amplitude and phase transmitted from each transmitting antenna using a weight vector included in the feedback information. When the base station transmits a signal, both the amplitude and phase of which have been controlled from a transmitting antenna 21, the mobile station receives the signal as if the fluctuations due to just fading of both the amplitude and phase were compensated for. Therefore, optimal reception is possible. Since fading changes as time elapses, both the generation and transmission of feedback information must happen in real time. However, since both the transmission format and transfer rate of an uplink data signal from a mobile station to a base station is predetermined, it takes too much time to transmit a lot of information. Therefore, the control cannot track the fading fluctuations. In order to track the fading fluctuations, the transmission rate of feedback information must be high. However, since the transmission rate of an uplink control channel is limited, if a plurality of pieces of new information are sequentially transmitted in a short cycle in order to control transmitting diversity at a high speed, an amount of information included in one time transmission becomes small (quantization becomes rough), and highly accurate control becomes impossible.

In the preferred embodiment of the present invention, each coefficient value in a weight vector is calculated and fed back in a different cycle instead of calculating and feeding back a signal transmitted from each antenna in the same cycle.

The details are described below.

Figure 3:
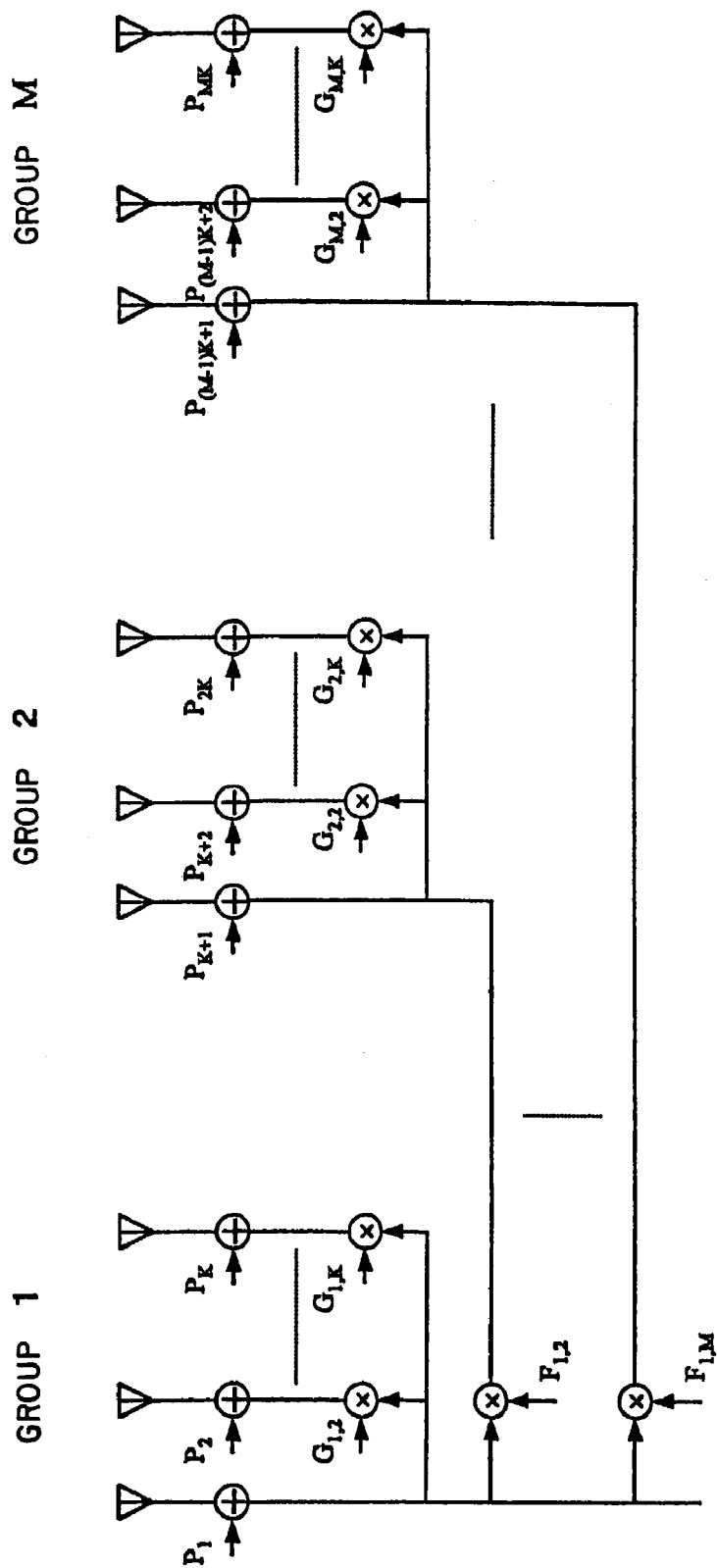
FIG. 3 shows an example configuration of transmitting antennas of a base station according to the preferred embodiment of the present invention.

FIG. 3 shows an example configuration of the transmitting antennas of a base station according to the preferred embodiment of the present invention.

As shown in FIG. 3, in a base station, transmitting antennas compose a plurality of groups, each consisting of a plurality of antennas. Transmitting antennas in the same group are located close to one another so that the fading correlation between the antennas is high and groups are installed apart from one another so that the fading correlation between the groups is low. Fading correlation is a numeric value indicating how similarly two signals transmitted from different antennas fade when the signals are received on a receiving side. Doppler effect and the like cause fading by reflection on buildings and mobile objects. Therefore, if a plurality of antennas transmitting signals are located close to one another, it follows that a mobile station receives the respective signals through similar routes. Accordingly, the signals suffer from similar fading. In such a case, it is said that the fading correlation between the signals is high. If a plurality of antenna transmitting signals are located apart from one another, it follows that the respective signals take different routes to a mobile station receives the signals. Therefore, the signals fade differently and then are received by the mobile station. In such a case, it is said that the fading correlation between the signals is low.

In a mobile station, an antenna control amount between groups is calculated in a shorter cycle than that of the antenna control amount within a group, and is transmitted to a base station side as feedback information. Signals from base-station transmitting antennas in the same group have a high fading correlation; the signals suffer from almost the same fading, but the signals each have a phase difference depending on the angle at which the signals reach the receiving antenna of the mobile station. Therefore, each channel response estimation value estimated using the signals from the plurality of base-station transmitting antennas in the same group has a phase difference that depends on the angle of the mobile station against the base station. Although these values change as the mobile station travels, the values change slowly compared with fading fluctuations. One antenna in each group is designated as a reference antenna, and each of the control amounts of antennas other than the reference antenna in the relevant group is normalized by the control amount of this reference antenna (each relative value calculated using the control amount of this reference antenna as a reference is used). This normalized antenna control amount in the group changes slowly as the mobile station travels. Therefore, the control cycle can be made relatively long.

However, since respective signals from base-station transmitting antennas belonging to different groups have a low fading correlation, the signals fade differently and independently by the time they reach the receiving antenna of the mobile station. Therefore, respective channel response estimation values (channel impulse response vector) estimated using respective signals from respective reference values belonging to different groups change quickly due to respective independent fading fluctuations. An antenna control amount obtained by normalizing the reference antenna control amount of one specific group by the reference antenna control amount of another group is defined as an inter-group antenna control amount. Since each inter-group antenna control amount changes quickly due to each independent fading fluctuation, in order to accurately control antennas, the control must be exercised in a short cycle.

The mobile station must recognize which signal comes from which group. However, it is sufficient to relate each antenna to each pilot signal transmitted from the antenna in advance. Since pilots are mutually orthogonal to one another, a receiving side can accurately recognize from which antenna the signal is transmitted by checking the pilot signal.

Both the inter-group antenna control amount $F_{1,m}$ and intra-group antenna control amount $G_{m,k}$ shown in FIG. 3 are calculated as follows. In the description given above, N, M and K=N/M are the total number of antennas, the number of antenna groups and the number of antennas in each group, respectively. * represents complex conjugation.

Overall reference antenna: Antenna #1

Intra-group reference antenna: Antenna #((m−1)K+1) (m−1, ..., M)

$$F_{1,m} = \frac{w_{(m-1)K+1}}{w_1} (m = 1, \ldots, M) \quad (9)$$

$$G_{m,k} = \frac{w_{(m-1)K+k+1}}{w_{(m-1)K+1}} (m = 1, \ldots, M, k = 1, \ldots, K) \quad (10)$$

Since fading correlation is high within a group, $|G_{m,k}|=1$ can be assigned. Specifically, it can be considered that the change due to fading is small within a group, and it is sufficient to take into consideration only change in phase. In order to keep total transmission power constant (=1.0), $F_{1,m}$ must be normalized as follows.

$$F'_{1,m} = \frac{F_{1,m}}{\sqrt{\frac{1}{KM}\sum_{j=1}^{M}|F_{1,j}|^2}}$$

Next, the fluctuation rate of fading is described.

Fading fluctuation rate is expressed by Doppler frequency.

$$f_d = \frac{v}{\lambda}$$

In the equation described above, v is the travel speed of a mobile station and λ is the carrier wavelength. For example, if a carrier frequency is 2 GHz and the travel speed of a mobile station is 60 km/h, $f_d$ becomes approximately 111 Hz. However, the angle of arrival of an incoming wave changes as the mobile station travels. For example, if the mobile station travels at a speed of 200 km/h at a place 200 meters ahead, the input angle changes by approximately 15 degrees per second. In this way, the fading fluctuation rate is higher by several tens of times to several hundreds of times than the fluctuation rate of an input angle. According to W-CDMA standards, a slot length is 666.7 μs and the update speed of feedback information is 1500 Hz. Therefore, if information about fading is not updated for each slot, a track characteristic degrades. However, there is no need to feedback information about input angle for each slot. For example, there will be no problem if information is updated for every 15 slots (=one frame).

By utilizing the difference in the fluctuation rates of the control information described above, a feedback amount of information can be reduced without performance degradation. Specifically, an inter-group antenna control amount changing at a high speed is updated and fed back in a short cycle, while each intra-group antenna control amount changing slowly compared with the inter-group antenna control amount is updated and fed back in a longer cycle. In other words, since the change of inter-group diversity control with a low fading correlation is faster than that of the data speed of feedback information, the frequency of updates is made large. However, since the change of intra-group diversity control with a high fading correlation is slower than that of the data speed of feedback information, the frequency of updates is made small.

Since each intra-group antenna control amount has been related to the angle of the mobile station with respect to the base station, in a macro-cell system with a relatively large cell radius, the deviation of an input angle becomes negligibly small. Therefore, a specific intra-group antenna control amount can also be used as the intra-group antenna control amount of another group. Specifically, transmitting only the intra-group control information of one specific group and controlling the antennas in the other group using this information can further reduce an amount of feedback information.

Figure 4:
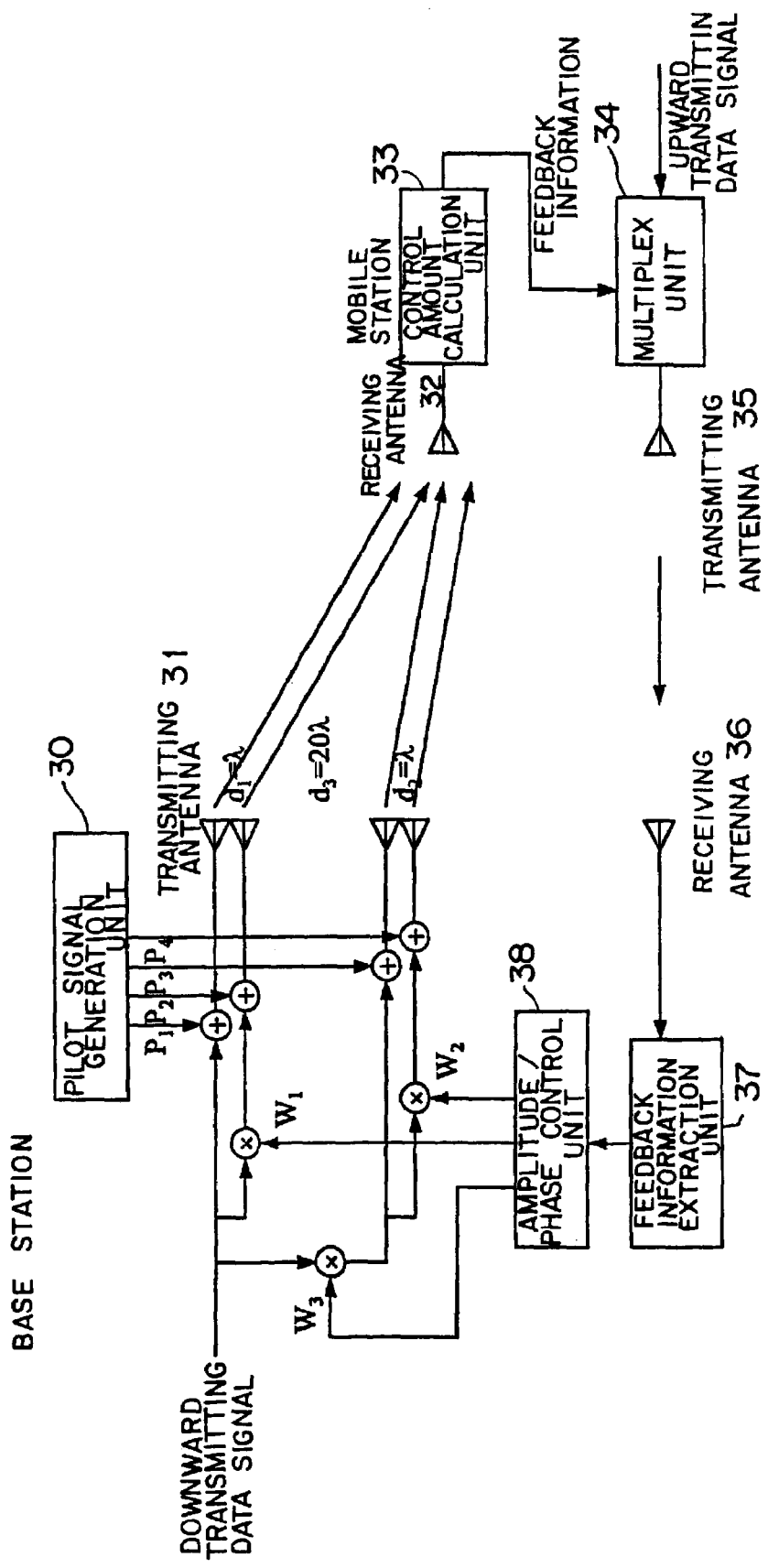
FIG. 4 shows the configuration of one preferred embodiment of the present invention.

FIG. 4 shows the configuration of one preferred embodiment of the present invention.

A case where the number of antennas N=4 and the number of antenna groups M=2 is described. A pilot signal generation unit 30 generates N=4 pilot signals $P_1(t)$, $P_2(t)$, $P_3(t)$ and $P_4(t)$, and each of the signals is transmitted from one of transmitting antennas 31. These pilot signals use mutually orthogonal bit sequences.

Each transmitting antenna 31 transmits the pilot signal to a mobile station. In the mobile station, a receiving antenna 32 receives the four pilot signals transmitted from each of four transmitting antennas, and a control amount calculation unit 33 estimates the channel of signals transmitted from each transmitting antenna 31 using the respective pilot signal. As a result, the channel impulse response vector is obtained from each signal and a weight vector that maximizes equation (5) is calculated. Since a method for calculating this weight vector is already publicly known, the description is omitted. When the weight vector is calculated, the control amount calculation unit 33 transfers the vector to a multiplex unit 34 as feedback information. The multiplex unit 34 multiplexes the feedback information with an upward data signal and transmits the information from a transmitting antenna 35. In a base station, a receiving antenna 36 receives the signal from the mobile station, and a feedback information extraction unit 37 extracts the feedback information from the signal. The extracted feedback information is inputted to an amplitude/phase control unit 38, each weight coefficient $w_1$, $w_2$ and $w_3$ included in the feedback information is multiplied to the respective downward transmitting data signal of each corresponding antenna, and the transmitting antennas 31 transmit the downward transmitting data signals. In this way, in this preferred embodiment, a closed loop for performing transmitting diversity control, including a base station and a mobile, is implemented.

FIG. 5 shows examples of a downlink pilot signal pattern in this preferred embodiment.

If each corresponding code is multiplied by each of the pilot signals $P_1$ through $P_4$ shown in FIG. 5, and the products of the entire pilot signal pattern are added up the result "0" is obtained. Specifically, the pilot signals $P_1$ through $P_4$ form a mutually orthogonal code word.

Each pilot signal's amplitude and phase change independently due to fading, and the combination of these signals is received by the antenna of a mobile station. A mobile-station receiver can calculate the channel response estimation values $h_1$, $h_2$, $h_3$ and $h_4$ of each pilot signal by correlating the incoming pilot signals with corresponding pilot signals $P_1(t)$, $P_2(t)$, $P_3(t)$ and $P_4(t)$, respectively, that are stored in advance on the mobile station side and by averaging the obtained correlations.

FIG. 6 shows both an example configuration of base-station transmitting antennas according to this preferred embodiment and antenna control information thereof.

FIG. 6A shows the transmitting antenna configuration of a base station. It is assumed that antennas ANT1 and ANT2 form group 1, and antennas ANT3 and ANT4 form group 2. It is also assumed that antennas ANT1 and ANT3 are the reference antenna of groups 1 and 2, respectively. It is further assumed that antenna ANT1 is also the reference antenna of all the groups 1 and 2. Antennas ANT1 and ANT2 are located apart from each other by one wavelength. Antennas ANT3 and ANT4 are also located apart from each other by one wavelength. Antennas ANT1 and ANT3 are located apart from each other by 20 wavelengths. Antennas ANT2 and ANT4 are also located apart from each other by 20 wavelengths.

Here, the spatial correlative characteristic of a base-station antenna is described.

If the input angles of signals from mobile stations are uniformly distributed with dispersion $\Delta\phi$, the envelope correlation coefficient of input waves is expressed as follows. In the equation, d represents the distance between two antennas.

$$\rho = \left(\frac{\sin X}{X}\right)$$

$$X = \frac{\pi d \Delta\phi}{\lambda}$$

Figure 7:
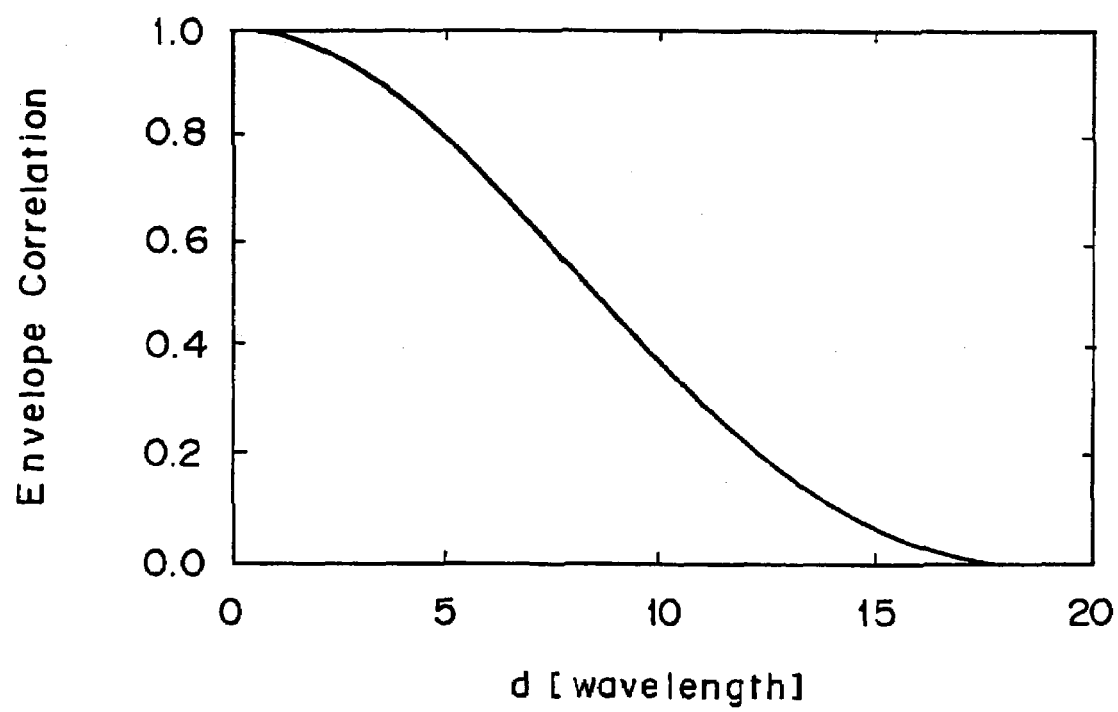
FIG. 7 shows an envelope correlation coefficient obtained when the angle dispersion $\Delta\phi$ of an input signal observed at a base station in a macro-cell environment is approximately 3.

The angle dispersion $\Delta\phi$ of each input signal observed at the base station in a macro-cell environment is approximately 3 degrees. FIG. 7 shows the envelope correlation coefficient in this case. It is seen from FIG. 7 that at $d \cong 19\lambda$ the input signals become uncorrelated. Therefore, according to the present invention, fading correlation can be made low by setting the distance between antenna groups to approximately 19 wavelengths or more. Fading correlation can also be made high by setting the distance between antennas in each group to one wavelength or less.

However, fading correlation is affected by a variety of factors, such as the height at which the antenna is installed, the size of the antenna and the like. Therefore, it is acceptable if the antennas are installed so that the distance between any two antennas in the same group is approximately the wavelength of an incoming signal. However, a person having ordinary skill in the art should set the distance between groups so that fading correlation is almost "0" in any situation.

Description will return to FIG. 6. In the following description it is assumed that amplitude is not controlled and only phase is controlled. Specifically, only a phase amount $\phi_i$ is controlled by assigning $a_1=1$ to $w_i=a_i e^{j\Phi_i}$. As shown in FIG. 6B, each of the control amount $\phi_1$ of antenna ANT2 using antenna ANT1 as a reference, the control amount $\phi_2$ of antenna ANT4 using antenna ANT3 as a reference and the control amount $\phi 3$ of antenna ANT3 using antenna ANT1 as a reference is quantized and is transmitted to the base station as feedback information. If each of the control amounts is quantized using one bit, for example, the setting is as follows.

$$\frac{-\pi}{2} < \phi_i \leq \frac{\pi}{2} \Rightarrow \phi_i^Q = 0 \quad (11)$$

$$\frac{\pi}{2} < \phi_i \leq \frac{3\pi}{2} \Rightarrow \phi_i^Q = \pi$$

In the expression, $\phi_i^Q$ is a quantized control amount.

FIGS. 8 through 11 show examples of the transmission format of feedback information in this preferred embodiment.

Figures 8, 9:
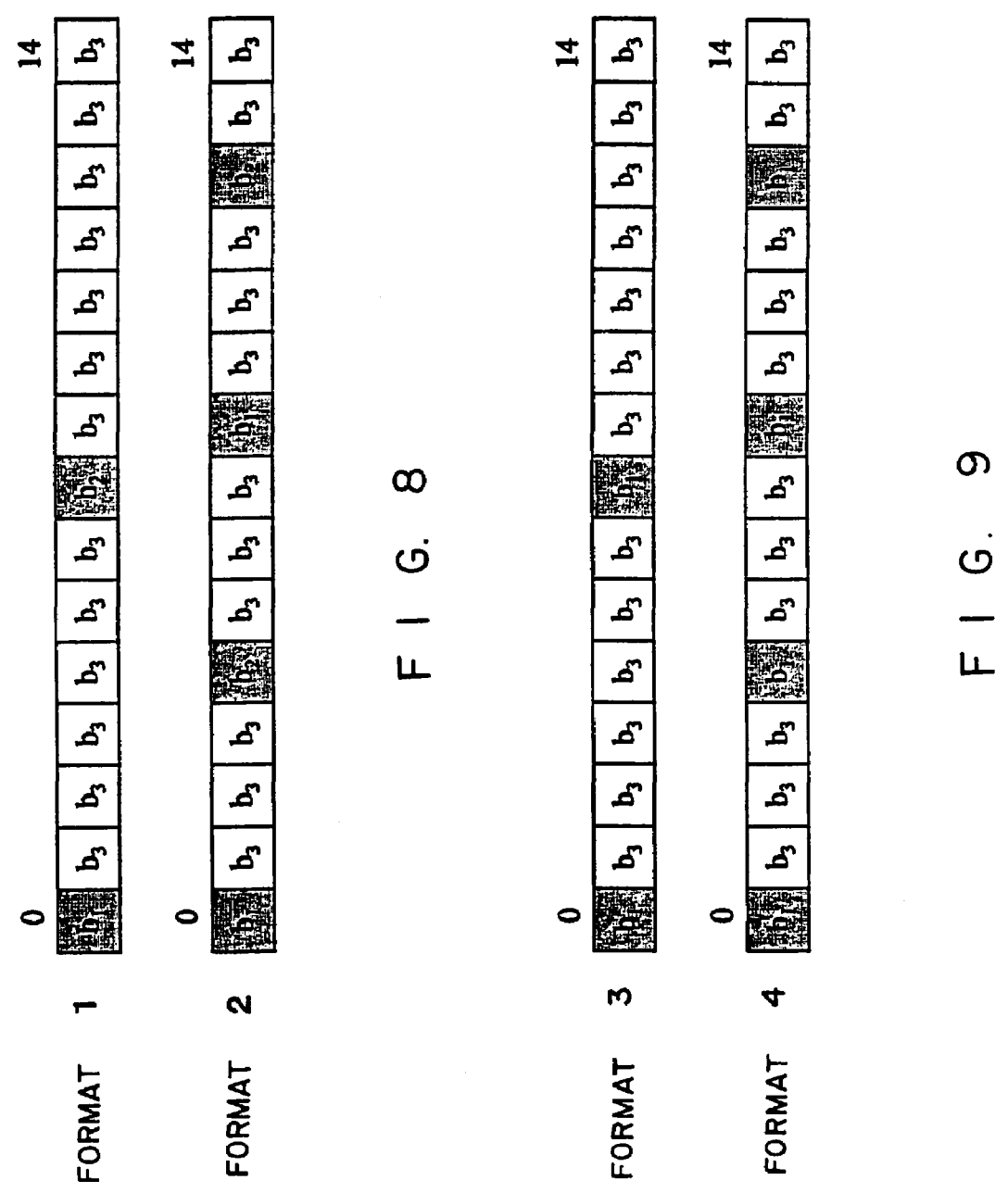

It is assumed that if $\phi_i^Q=0$, feedback information $b_i=0$ and that if $\phi_i^Q=\pi$, feedback information $b_i=1$. As shown in FIG. 8, this feedback information is multiplexed with an uplink channel so that the transmission rate of $b_3$ may become higher than the transmission rate of $b_1$ or $b_2$ and is transmitted to a base station. One frame of length 10 ms is composed of 15 slots in compliance with the W-CDMA frame format. This transmission format transmits feedback information of one bit in each slot. Format1 transmits both one $b_1$ and one $b_2$ in one frame, and format2 transmits both two $b_1$ and two $b_2$ in one frame.

In the base station, the phase control of each transmitting antenna is conducted using the feedback information received in an uplink channel. A corresponding antenna is directly controlled by the feedback information received in the immediately previous slot. In this case, antennas other than the corresponding antenna store the latest feedback information and use the information for their control.

However, ANT4 shown in FIG. 6A is controlled not only by control amount d2, but also by the control amount d3 of ANT 3. Specifically, ANT4 is frequently controlled by d3 and is also controlled by d2 less frequently. This description also applies to ANT4 shown in FIG. 6B.

Filtering feedback information can also reduce the number of transmission errors and the number of quantization errors. For example, for the filtering, a method using the average value of the control amount of the feedback information received in the immediately previous slot and the control amount of the feedback information received in receiving slots before the immediately previous slot is used.

As the feedback information of an intra-group antenna control amount, an updated control amount is transmitted every time the feedback information is transmitted. However, for example, alternatively, in the same frame, the same feedback information can also be repeatedly transmitted. In this case, the number of transmission errors in the base station can be reduced by combining a plurality of pieces of feedback information received in the frame.

Since each intra-group antenna control amount relates to the angle of a mobile station against the base station in a macro-cell system with a to some extent large cell radius, the deviation of the input angle within a group is negligibly small. Therefore, if control is exercised within each group using the same intra-group antenna control amount, there is no problem. Therefore, transmitting only the intra-group control information of one specific group and controlling other groups using this information can further reduce an amount of feedback information.

FIG. 9 shows a feedback information transmission format used to transmit only $b_1$ as intra-group control information. Format3 transmits two $b_1$ in one frame and format 4 transmits four $b_1$ in one frame.

In this preferred embodiment too, as the feedback information of an intra-group antenna control amount, an updated control amount can be transmitted every time the feedback information is transmitted. Alternatively, for example, the same feedback information can be repeatedly transmitted within the same frame.

Another transmission format in which a control amount calculated in a mobile station is quantized using a plurality of bits is described below.

Figure 10:
FIG. 10 shows an example of the transmission format of feedback information in the preferred embodiment (No. 3).

FIG. 10 shows the feedback information transmission format in which $b_1$ and $b_3$ are quantized using three bits and four bits, respectively. Tables 1 and 2 of FIG. 11 show the correspondence between the feedback information $b_3$ of an inter-group antenna control amount and a control amount. Table 3 shows the correspondence between the feedback information $b_1$ of an intra-group antenna control amount and a control amount.

In this example, only the feedback information of an intra-group antenna control amount $b_1$ is transmitted using the format shown in FIG. 9. As is clearly seen from Tables 1 and 2 of FIG. 11, feedback information bit $b_3$ is composed of four bits; three bits of $b_3(3)$ through $b_3(1)$ representing a phase control amount and one bit of $b_3(0)$ representing an amplitude control amount. Format5 shown in FIG. 10 includes feedback information bit $b_3$ in one frame. However, three words of feedback information bit $b1$ are composed of three bits of $b_1(2)$ through $b_1(0)$ representing a phase control amount. According to format5 shown in FIG. 10, three bits of feedback information bit $b_1$ are distributed and located in one frame, and all the three bits together form one word.

Figure 12:
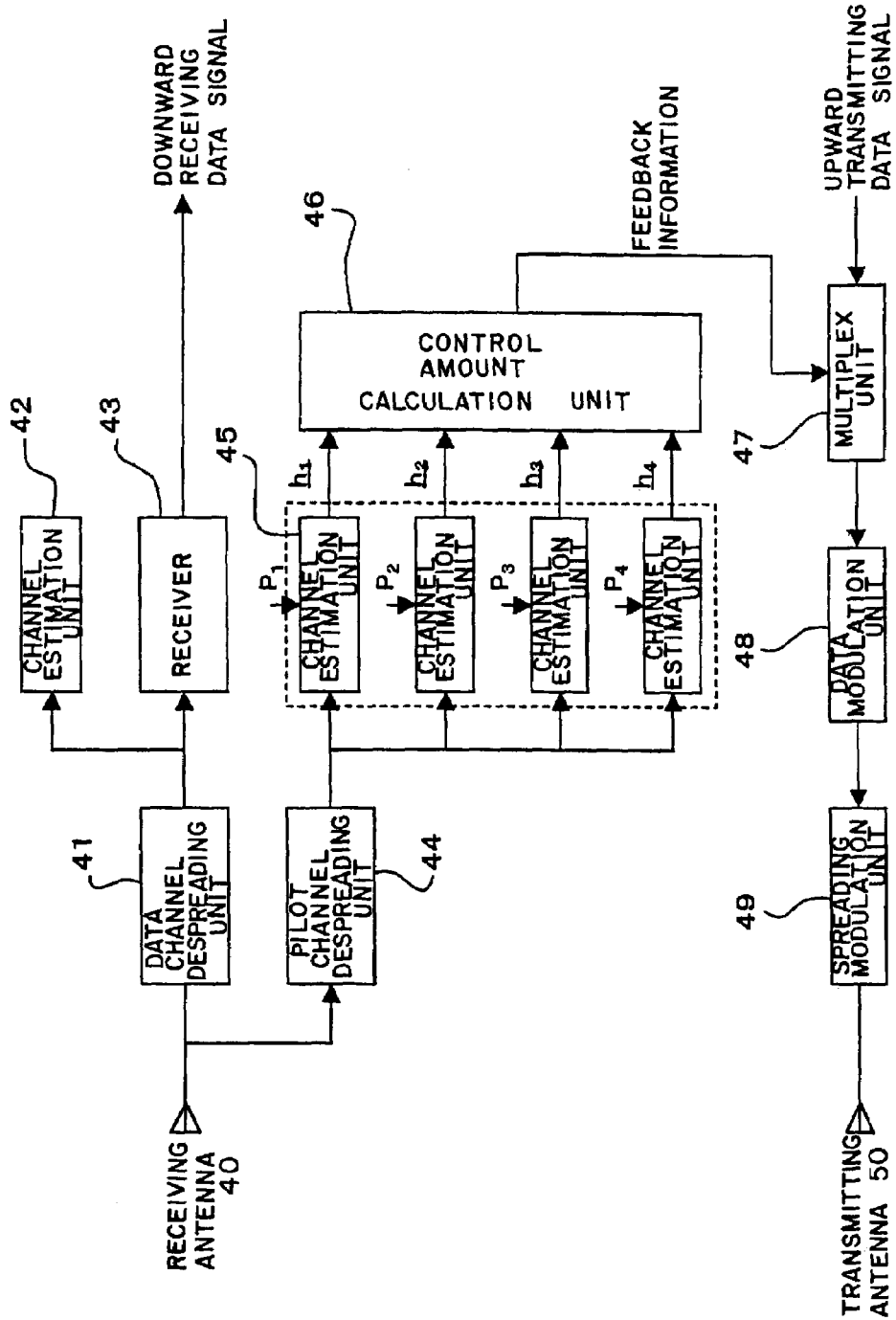
FIG. 12 shows an example configuration of a mobile station for transmitting feedback information to a base station according to the formats shown in FIGS. 8 through 11.

FIG. 12 shows an example configuration of a mobile station that transmits feedback information to a base station according to the formats shown in FIGS. 8 through 11.

On receipt of a signal from a base station via its receiving antenna, a mobile station branches the receiving signal into two signals and inputs one signal and the other signal to a data channel despreading unit 41 and a pilot channel despreading unit 44, respectively. The data channel dispreading unit 41 despreads the data channel signal and inputs the signal to both a channel estimation unit 42 and a receiver 43. The receiver 43 reproduces the downward data signal, based on the channel estimation result of the channel estimation unit 42 and presents the signal to a user as voice or data. The pilot channel dispreading unit 44 despreads the incoming signal using a pilot channel dispreading code and inputs the signal to a channel estimation unit 45. The channel estimation unit 45 correlates the despread signal to each pilot signal pattern and obtains channel estimation values $H=[\underline{h}_1, \underline{h}_2, \underline{h}3$ and $\underline{h}_4]$ for paths from each transmitting antenna to the mobile station. A control amount calculation unit 46 calculates a weight vector based on these channel estimation values and determines feedback information to be transmitted. A multiplex unit 47 multiplexes this feedback information with an upward control channel. A data modulation unit 48 modulates the feedback information. A spreading modulation unit 49 spread-modulates the feedback information. Then, the feedback information is transmitted to the base station from a transmitting antenna 50.

In FIG. 13, the same reference numbers are attached to the same constituent components as those in FIG. 4 and their descriptions are omitted.

In this preferred embodiment, a base station uses both upward feedback information and an upward channel arriving method estimation result as intra-group antenna control information. In the base station, input direction estimation units 62 and 63 estimate the arriving direction of an incoming signal based on an upward receiving signal received by an array antenna (a plurality of antennas used in transmission diversity: transmitting/receiving antenna 60). Since arriving direction strongly depends on the angle of a mobile station against a base station, a method for setting the direction of a downlink transmitting beam (direction in which the strength of a wave transmitted from an antenna is large) to this uplink signal input direction is known. However, in a system where uplink and downlink frequencies are different, this assumption does not always hold true and depends on the propagation environment.

Upon receipt of the uplink feedback information via an antenna 60, a receiving processing unit 61 performs the despeading and the like of the uplink feedback information and relays the information to a feedback information extraction unit 37. When the feedback information extraction unit 37 extracts a control amount from the uplink feedback information, an amplitude/phase control unit 38' compares the control amount with the arriving direction estimation value and determines to use either the control amount received from the uplink line or the arriving direction estimation value. Then, the unit 38' controls the amplitude/phase of a transmitting signal.

Figure 14:
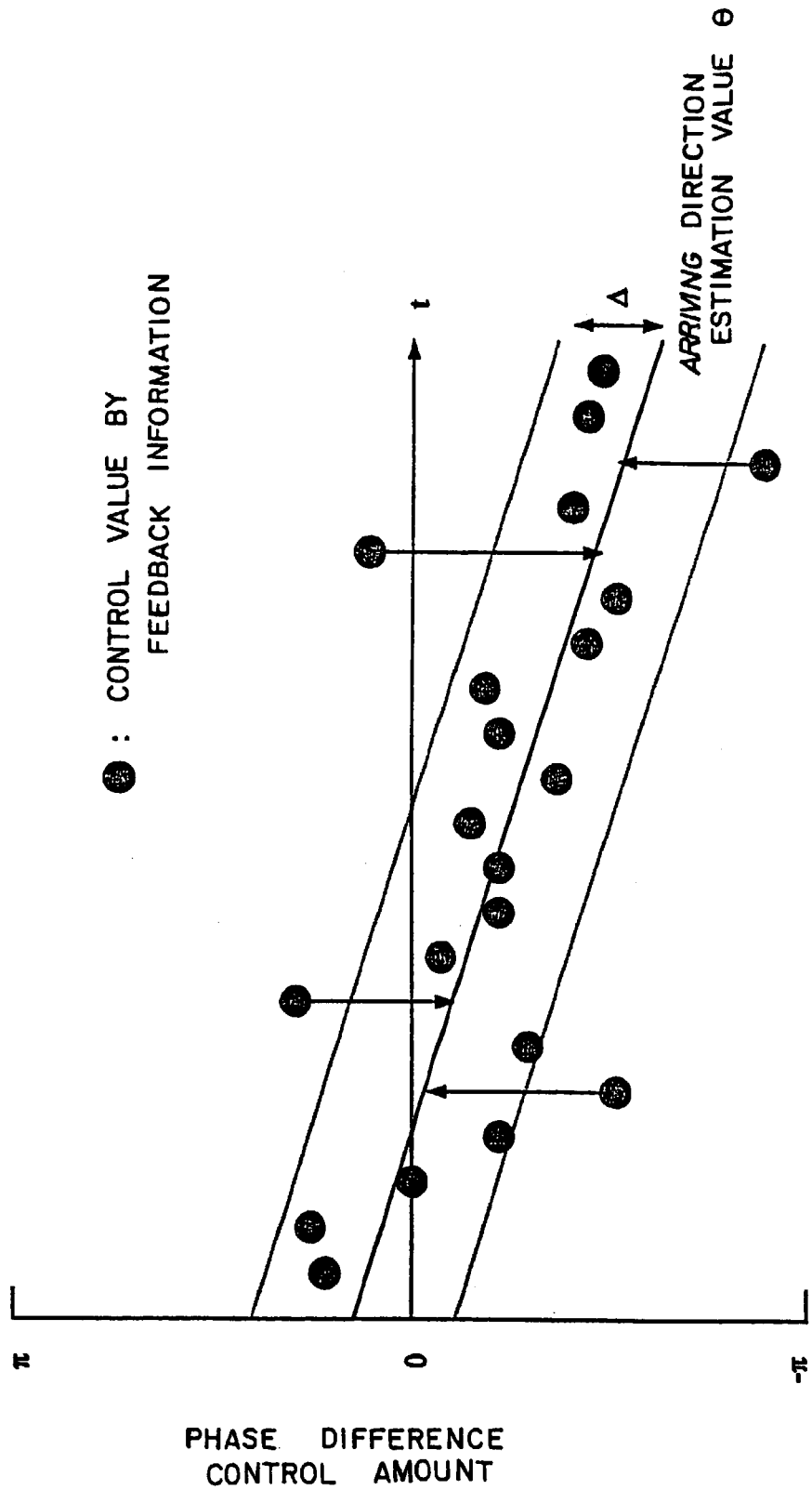
FIG. 14 shows an antenna phase difference control method within a group in the second preferred embodiment.

As shown in FIG. 14, in this preferred embodiment, if the intra-group phase difference is not within a specific range $[\theta-\Delta, \theta-\Delta]$ with the arriving direction estimation result $\theta$ of the uplink channel as a center, control is exercised using only the arriving direction estimation result $\theta$ since the control amount by the uplink feedback information is related to an uplink channel arriving direction estimation result $\theta$. Specifically, if the control amount in the feedback information is too far from the arriving direction estimation result $\theta$, it is judged that a bit error or the like has occurred during transmission of the feedback information, and the feedback information is inaccurate. Then, the feedback information is discarded and only phase is controlled using the arriving direction estimation result $\theta$.

Alternatively, a control amount in the uplink feedback information of intra-group phase difference information can be sampled for a prescribed time period. If it is judged that variance of the samples is large (for example, specifically, if the samples are dispersed more widely than a specific predetermined threshold value), control can be exercised using only the arriving method estimation result $\theta$ without utilizing the feedback information.

Figure 15:
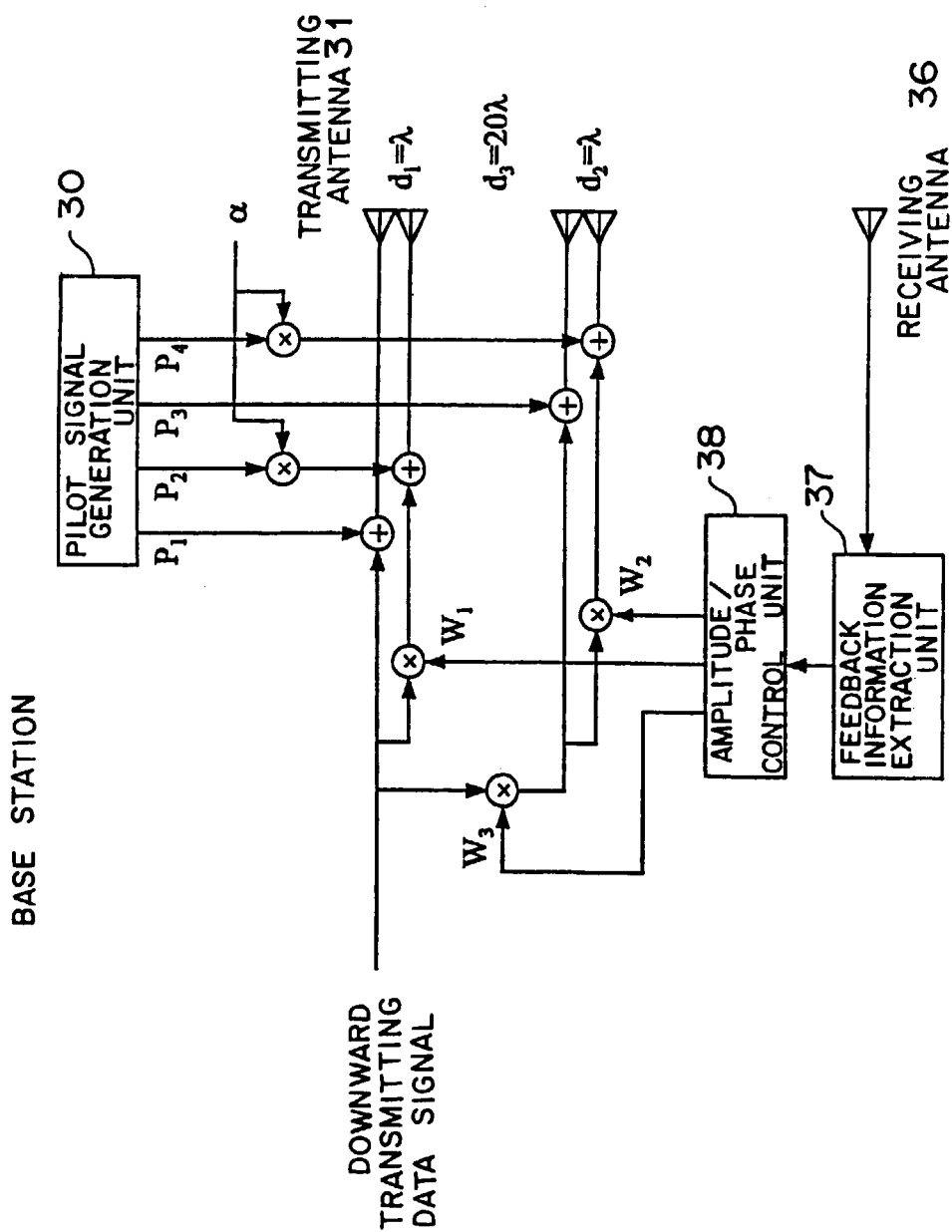
FIG. 15 shows the configuration of the third preferred embodiment of the present invention.

FIG. 15 shows the configuration of the third preferred embodiment of the present invention.

In FIG. 15, the same reference numbers are attached to the same components as those in FIG. 4, and their descriptions are omitted.

In this case, the transmitting powers of pilot signals $P_1$ and $P_3$ are set smaller than the transmitting powers of pilot signals $P_2$ and $P_4$, respectively. In this preferred embodiment, this is implemented by multiplying pilot signals $P_2$ and $P_4$ by a coefficient a $(0<\alpha \leq 1)$. Although pilot signals $P_2$ and $P_4$ are needed to estimate channel impulse response vectors $\underline{h}_2$ and $\underline{h}_4$, $\underline{h}_2$ and $\underline{h}_4$ have high fading correlations to $\underline{h}_1$, and $\underline{h}_3$, respectively. Therefore, $\underline{h}_2/\underline{h}_1$ and $\underline{h}_4/\underline{h}_3$ that are normalized by them strongly depend on an angle of the mobile station against the base station. Since these values fluctuate slowly compared with fading fluctuation, estimation accuracy can be improved by taking a long time average of pilot signals $P_2$ and $P_4$ even if incoming power on the mobile station side is low. Both $\phi_1$ and $\phi_2$ are calculated as follows.

$$\phi_1 = \underline{h}_2/\underline{h}_1, \phi_2 = \underline{h}_4/\underline{h}_3 \qquad (12)$$

Since interference to data signals by pilot signals can be suppressed to a low level by setting the transmitting powers of pilot signals $P_2$ and $P_4$ to a low level, transmission capacity can be increased.

Since both $\underline{h}_2/\underline{h}_1$ and $\underline{h}_4/\underline{h}_3$ depend on the angle of the mobile station against the base station and fluctuate more slowly than a fading fluctuation, estimation accuracy can be improved by taking a long time average of pilot signals $P_2$ and $P_4$ even if an incoming power is low. For example, estimation values $\phi_1(n)$, $\phi_2(n)$ and $\phi_3(n)$ at the n-th slot can be calculated as follows. In these equations, N is the estimated average number of slots of estimation values $\phi_1(n)$ and $\phi_2(n)$ $$\phi_1(n) = \frac{1}{N}\sum_{i=0}^{N-1}\frac{h_2(n-i)}{h_1(n-i)}$$

$$\phi_2(n) = \frac{1}{N}\sum_{i=0}^{N-1}\frac{h_4(n-i)}{h_3(n-i)}$$

$$\phi_3(n) = \frac{h_3(n)}{h_1(n)}$$

In this way, when both $\phi_1$ and $\phi_2$ are calculated by taking a N-times time (number of slots) average of $\phi_3$, the same estimation accuracy as that of $\phi_3$ can be obtained even if $\alpha=1/N$. Specifically, in case N=4, $\alpha=\frac{1}{4}$ can be assigned.

If the number of transmitting antennas is increased by utilizing differences in the fluctuation rate of control information, the following effects can be obtained.

The increase in the amount of upward feedback information can be suppressed.

Characteristics degrade little in the case of a high fading frequency.

The antenna installation space of a base station can be reduced.

What is claimed is:

1. A transmitting diversity communications apparatus, including a base station adopting a transmitting diversity method, for controlling transmitting signals according to information from a mobile station, comprising:
   an antenna unit composed of a plurality of antenna groups, each group consisting of a plurality of antennas located close to one another so that fading correlation between the antennas is high, and the antenna groups are located apart from one another so that fading correlation between the groups is low; and
   a control unit receiving both first control information for intra-group antenna control, with a low transfer rate and second control information for inter-antenna group control, with a high transfer rate that are transmitted from a mobile station, and controlling a phase of a signal transmitted by the antenna unit.

2. The transmitting diversity communications apparatus according to claim 1, wherein the mobile station determines a control amount of the phase using pilot signals transmitted from the base station.

3. The transmitting diversity communications apparatus according to claim 1, wherein said control unit also controls amplitude in addition to the phase.

4. The transmitting diversity communications apparatus according to claim 3, wherein the mobile station determines control amounts of both the phase and amplitude using pilot signals transmitted from the base station.

5. The transmitting diversity communications apparatus according to claim 4, wherein the mobile station estimates a channel response from each antenna to the mobile station by correlating a pilot signal from the base station to a known pilot signal on a mobile station side and calculating the control amount using this channel response estimation value.

6. The transmitting diversity communications apparatus according to claim 1, wherein the mobile station transmits information describing the difference in channel response estimation values between each intra-group antenna of said antenna unit and a reference antenna and information describing the difference in channel response estimation values between each antenna group and a reference antenna of a specific antenna group to the base station as the first and second control information, respectively.

7. The transmitting diversity communications apparatus according to claim 1, wherein the mobile station transmits control information about each antenna group and control information about an intra-group antenna within a specific antenna group to the base station as the second and first control information, respectively.

8. The transmitting diversity communications apparatus according to claim 1, wherein said control unit controls the transmitting of a signal from the base station using an input direction estimation result of an uplink channel signal in addition to the first and second control information.

9. The transmitting diversity communications apparatus according to claim 8, wherein if transmitting signal control amounts obtained from the first and second control information do not fall within a specific range with an arriving direction estimation result of the uplink channel signal as a center, transmission is controlled using the input direction estimation result.

10. The transmitting diversity communications apparatus according to claim 8, wherein if transmitting signal control amount dispersion obtained from the first control information is larger than a prescribed value, transmission is controlled using only an arriving direction estimation result.

11. The transmitting diversity communications apparatus according to claim 1, wherein control is exercised by a filtering result using both currently received first and second information and one or more previously received first and second control information.

12. The transmitting diversity communications apparatus according to claim 1, wherein the power of a signal transmitted from an antenna other than a reference antenna is set at a lower level than the power of a signal transmitted from a reference antenna of each antenna group.

13. A transmitting diversity communications apparatus, including a base station adopting a transmitting diversity method, for controlling transmitting signals according to information from a mobile station, comprising:
   an antenna unit composed of a plurality of antenna groups, each group consisting of a plurality of antennas located close to one another so tat fading correlation between the antennas is high, and the antenna groups are located apart from one another so that fading correlation between the groups is low; and
   a control unit receiving both first control information for intra-group antenna control, with a low transfer rate and second control information for inter-antenna group control, with a high transfer rate that are transmitted from a mobile station, and controlling both amplitude and phase of a signal transmitted by the antenna unit.

14. A mobile station of a transmitting diversity communications apparatus, including a base station adopting a transmitting diversity method, for controlling transmitting signals according to information from a mobile station, comprising:
   a receiving unit receiving a signal transmitted from an antenna unit composed of a plurality of antenna groups, each group consisting of a plurality of antennas located close to one another so that fading correlation between the antennas is high, and the antenna groups are located apart from one another so that fading correlation between the groups is low;

an antenna specifying unit identifying an antenna that has transmitted the received signal; and a transmitting unit transmitting first control information about intra-group antenna control of the received signal to the base station at a prescribed transfer rate and transmitting second control information about inter-group antenna control of the received signal to the base station at a higher transfer rate than the prescribed transfer rate.

15. A transmitting diversity communications method, including a base station adopting a transmitting diversity method, for controlling transmitting signals according to information from a mobile station, comprising:

providing a plurality of antenna groups, each group consisting of a plurality of antennas, placing the antennas in the same group close to one another so that fading correlation between the antennas in the same group is high and placing the antenna groups apart from one another so that fading correlation between the groups is low; and receiving both first control information for intra-group antenna control, with a low transfer rate and second control information for inter-antenna group control, with a high transfer rate that are transmitted from a mobile station and controlling the phase of a signal transmitted by the antenna unit.

16. A communications system for controlling the phase of each of transmitting signals transmitted from a plurality of antennas of a base station according to phase control information from a mobile station, wherein some of the plurality of antennas of the base station have a location relation in which, with respect to one antenna, other antennas are placed where fading correlation is high, and where fading correlation is low, and the mobile station transmits phase control information about an antenna located in the position having a high fading correlation and phase control information about an antenna located in the position having a low fading correlation to the base station with low frequency and high frequency, respectively.

17. A communications system for controlling the phase of each of transmitting signals transmitted from a plurality of antennas of a base station according to phase control information from a mobile station, wherein some of the plurality of antennas of the base station have a location relation in which, with respect to one antenna, other antennas are placed where fading correlation is high, and where fading correlation is low, and the mobile station transmits phase control information about an antenna located in the position having a high fading correlation to the base station with lower frequency than frequency of phase control information of an antenna located in the position having a low fading correlation.

18. A communications system for controlling the phase of each of transmitting signals transmitted from a plurality of antennas of a base station according to phase control information from a mobile station, wherein all the plurality of antennas except a specific antenna of the base station are located in positions having a high fading correlation to the antenna, the mobile station transmits phase control information about the antennas except the specific antenna to the base station with low frequency, and the fading correlation is so high that a difference between channel impulse response vectors estimated in the mobile station corresponding to pilot signals transmitted from the base station substantially depends on a phase difference corresponding to an angle of the mobile station against the base station.

19. A communications system for controlling the phase of each of transmitting signals transmitted from at least three antennas of a base station according to phase control information from a mobile station, wherein all the antennas of the base station are located in positions having a low fading correlation to each other, and the mobile station transmits phase control information with reference to a specific antenna about all the antennas except the specific antenna to the base station with high frequency, so that a frequency corresponding to at least one antenna is sufficiently high to track fading fluctuations corresponding to the antenna.

20. A mobile station of a communications system for controlling the phase of each of signals transmitted from a plurality of antennas on a base station side where some of the plurality of antennas and the other antennas except a specific antenna are located in positions having a high fading correlation and in positions having a low fading correlation, respectively, to the antenna according to phase control information from a mobile station, comprising:

a control unit generating phase control information about the plurality of antennas; and a transmitting unit transmitting phase control information about an antenna located in a position having a high fading correlation and phase control information of an antenna located in a position having a low fading correlation to the base station with low frequency and high frequency, respectively.

21. A mobile station of a communications system for controlling the phase of each of signals transmitted from a plurality of antennas on a base station side where some of the plurality of antennas and the other antennas except a specific antenna are located in positions having a high fading correlation and in positions having a low fading correlation, respectively, to the antenna according to phase control information from a mobile station, comprising:

a control unit generating phase control information about the plurality of antennas; and a transmitting unit transmitting phase control information about an antenna located in a position having a high fading correlation to the base station with lower frequency than frequency of phase control information of an antenna located in a position having a low fading correlation.

22. A mobile station of a communications system for controlling the phase of each of signals transmitted from a plurality of antennas on a base station side where the other of the plurality of antennas are located in positions having a high fading correlation with one antenna according to phase control information from a mobile station, comprising:

a control unit generating phase control information about the plurality of antennas;

a transmitting unit transmitting antenna phase control information about all the antennas except the specific antenna to the base station with low frequency, and the fading correlation is so high that difference between channel impulse response vectors estimated in the mobile station corresponding to pilot signals transmitted from the base station substantially depends on a phase difference corresponding to an angle of the mobile station against the base station.

23. A mobile station of a communications system for controlling the phase of each of signals transmitted from at least three antennas on a base station side where all the antennas are located in positions having a low fading correlation to each other, comprising:
 a control unit generating phase control information with reference to a specific antenna about all the antennas except the specific antenna; and
 a transmitting unit transmitting phase control information about all the antennas except the specific antenna to the base station with high frequency, so that a frequency corresponding to at least one antenna is sufficiently high to track fading fluctuations corresponding to the antenna.

* * * * *